(12) United States Patent
Cherry

(10) Patent No.: US 6,416,094 B1
(45) Date of Patent: Jul. 9, 2002

(54) ENERGY ABSORBING BUMPER

(75) Inventor: William W. Cherry, Thornhill (CA)

(73) Assignee: Talfourd-Jones Inc., Toronto (CA)

( * ) Notice: Subject to any disclaimer, the term of this patent is extended or adjusted under 35 U.S.C. 154(b) by 0 days.

(21) Appl. No.: 09/915,525

(22) Filed: Jul. 27, 2001

(51) Int. Cl.$^7$ .............................................. B60R 19/03
(52) U.S. Cl. ...................... 293/120; 293/108; 293/132; 293/136
(58) Field of Search ............................ 293/120, 108, 293/132, 136

(56) References Cited

U.S. PATENT DOCUMENTS

| | | | | |
|---|---|---|---|---|
| 3,666,310 A | * | 5/1972 | Burgess et al. | 293/120 |
| 3,856,615 A | * | 12/1974 | Dreher | 293/136 |
| 3,888,531 A | * | 6/1975 | Straza et al. | 293/120 |
| 3,933,387 A | * | 1/1976 | Salloum et al. | 293/120 |
| 3,938,841 A | | 2/1976 | Glance et al. | |
| 3,989,293 A | | 11/1976 | Haberle et al. | |
| 4,022,505 A | * | 5/1977 | Saczawa, Jr. | 293/120 |
| 4,050,689 A | | 9/1977 | Barton et al. | |
| 4,328,986 A | * | 5/1982 | Weller et al. | 293/120 |
| 4,348,042 A | * | 9/1982 | Scrivo | 293/120 |
| 4,427,225 A | | 1/1984 | Bauer et al. | |
| 4,569,865 A | * | 2/1986 | Placek | 293/120 |
| 4,586,739 A | * | 5/1986 | Loren et al | 293/120 |
| 4,613,177 A | * | 9/1986 | Loren et al. | 293/120 |
| 4,616,866 A | * | 10/1986 | Loren et al. | 293/120 |
| 4,635,984 A | * | 1/1987 | Loren et al. | 293/120 |
| 4,652,031 A | * | 3/1987 | Loren et al. | 293/120 |
| 4,722,563 A | * | 2/1988 | Loren et al. | 293/120 |
| 4,925,224 A | | 5/1990 | Smiszek | |
| 5,005,887 A | * | 4/1991 | Kelman | 293/120 |
| 5,031,947 A | | 7/1991 | Chen | |
| 5,056,840 A | * | 10/1991 | Eipper et al. | 293/120 |
| 5,078,439 A | * | 1/1992 | Terada et al. | 293/122 |
| 5,139,297 A | | 8/1992 | Carpenter et al. | |
| 5,154,462 A | * | 10/1992 | Carpenter | 293/120 |
| 5,219,197 A | * | 6/1993 | Rich et al. | 293/120 |
| 5,265,925 A | * | 11/1993 | Cox et al. | 293/120 |
| 5,658,027 A | | 8/1997 | Eissinger et al. | |
| 5,984,389 A | * | 11/1999 | Nuber et al. | 293/136 |
| 6,165,588 A | * | 12/2000 | Wycech | 293/120 |
| 6,179,353 B1 | * | 1/2001 | Heatherington et al. | 293/120 |
| 6,308,999 B1 | * | 10/2001 | Tan et al. | 293/120 |

FOREIGN PATENT DOCUMENTS

| | | | |
|---|---|---|---|
| GB | 2 033 535 | * | 5/1980 |
| JP | 55 55031 | * | 4/1980 |
| JP | 55 102745 | * | 8/1980 |
| JP | 57 87742 | * | 6/1982 |
| JP | 62 128732 | * | 6/1987 |

* cited by examiner

Primary Examiner—Stephen T. Gordon
Assistant Examiner—Kiran B. Patel
(74) Attorney, Agent, or Firm—Paul J. Field

(57) ABSTRACT

A resilient bumper assembly for a vehicle having an elongate horizontal beam mounted transversely to an end of the vehicle. Exterior flexible sheet cladding mounted on the beam defines an elongate internal chamber between its inner surface and the outer surface of the beam. An elongate resilient impact absorber is mounted to the beam and housed within the internal chamber, with top, bottom, inner and outer surfaces. Vertically extending cavities within the impact absorber, each opening to at least one of the top and bottom surfaces of the impact absorber provide resilient collapsing and rebound of the impact absorber on impact. The absorber may include variations in the size and shape of cavities, thickness of walls between cavities, and variations in the characteristics of material of which it is moulded in order to modify the resilient characteristics of the absorber to suit different design needs. By simply adopting a different pattern, shape or size of cavity, the resilience of the absorber may be easily adjusted without changing the external size or shape of the impact absorber.

18 Claims, 5 Drawing Sheets

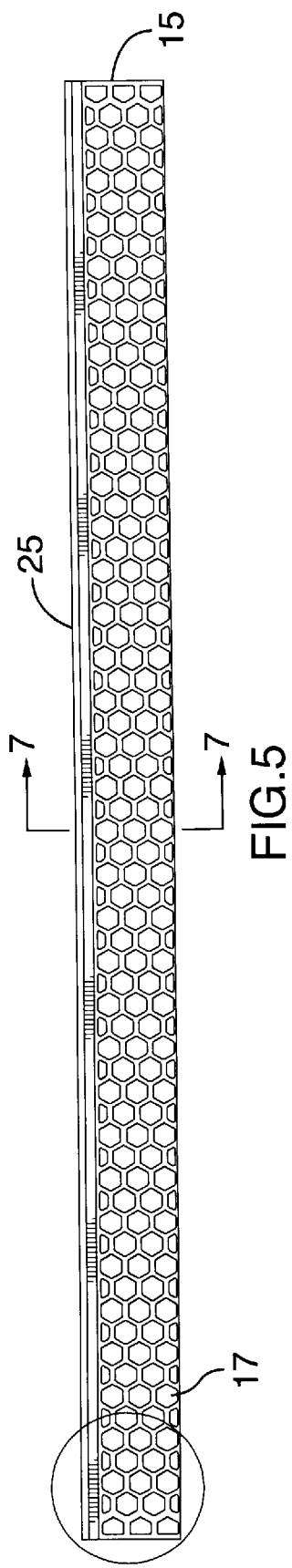
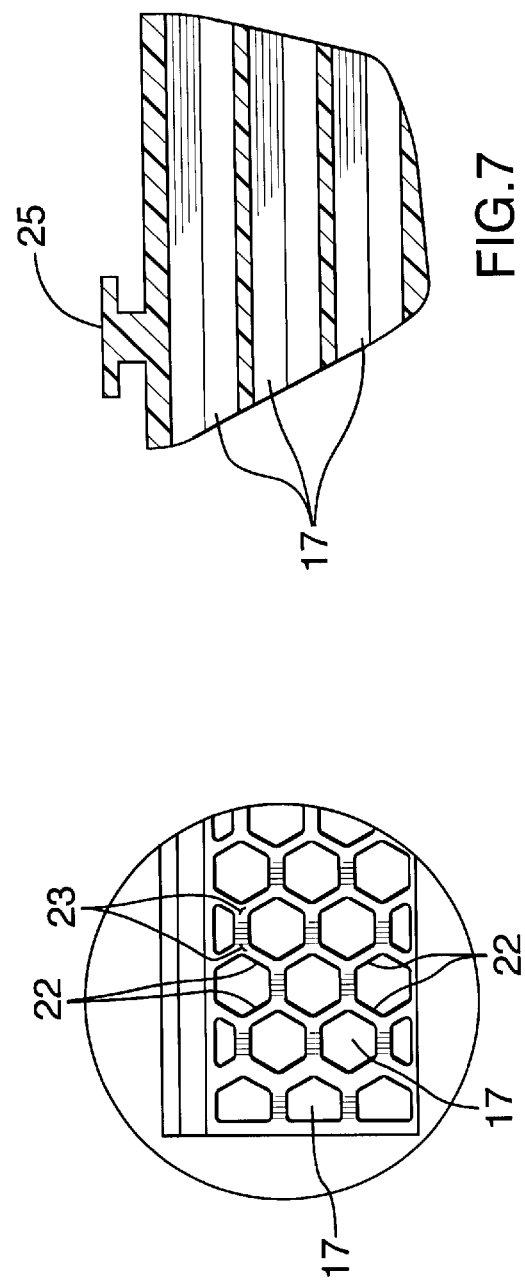

ENERGY ABSORBING BUMPER

TECHNICAL FIELD

The invention relates to a resilient bumper assembly for a vehicle having a horizontal beam, flexible sheet cladding and impact absorber of variable resilience.

BACKGROUND OF THE ART

Motor vehicles such as buses, trucks, tractors and passenger cars absorb the impact from collision with other vehicles or stationary objects with front and rear bumpers mounted to the vehicle frame, often with telescoping cylinders to absorb shock. In general, bumpers are expected to withstand the impact of collision at a relative velocity of 5 to 15 km/h without significant damage. Many conventional bumpers include impact absorbing means that deform permanently or resiliently during collision thus preventing damage to the vehicle frame or adjacent components. Bumper systems are generally provided in addition to other passenger restraint systems such as seatbelts and collapsible steering columns, expandable air bags that are more active on higher speed impacts.

A typical low impact absorbing bumper is shown in U.S. Pat. No. 5,139,297 to Carpenter et al. that includes a foamed energy absorbing block of polypropylene or foam that is positioned between a relatively stationary transverse beam and surrounded by a rigid forward face bar with backing bar that slide together rearwardly during impact relative to the stationary beam.

The resilient foam is contained as the face bar slides rearwardly under impact and serves to cushion the impact of collision. A disadvantage of this prior art system is that the metal components may corrode and seize up thus preventing the sliding contact between the various components upon which the entire system relies. Failure to slide and compress the foam material can cause unreliable performance and complete seizing of the sliding action can result in unexpected damage to the vehicle and injury to passengers. The rigid face bar does not itself deform locally but rather distributes the impact load more uniformly over the surface of the contained resilient component.

Another conventional bumper is shown in U.S. Pat. No. 3,888,531 to Straza et al. Rather than using a resilient shock absorbing material, Straza et al. utilizes frangible permanently deformable sheet metal formed for example in the shape of a honey comb matrix optionally filled with a wax like material to increase resistance to deformation on low impact collision. The theory behind the use of frangible shock absorbing sheet metal material is that on receiving a major impact, the frangible material will extrude the wax like material from the honeycomb cells and permanently deform the sheet metal honeycomb thereby reducing or dispersing the force of impact.

A significant disadvantage of such permanently deformable, sacrificial or frangible bumpers is apparent in the case of urban transit vehicles where frequent collisions occur with other buses during routine maintenance and rapid marshalling of the buses. The cost and inconvenience of replacing frangible shock absorbing bumpers is unacceptable and in such applications a resilient deformable bumper is preferred. However, as mentioned above in respect of Carpenter et al., corrosion, contamination with dust, and salt can detrimentally affect the sliding components of such prior art bumpers.

Various other prior art bumpers include a metal shell or plastic shell that is filled with foam shock absorbing material and mounted to the vehicle on a relatively rigid beam. Such bumpers are unsuitable for low cost fleet operations such as urban buses, trucks, delivery vehicles and taxis since frequent collisions at low impact can cause significant damage, vehicle downtime and may require replacement of the entire bumper in many cases.

It is an object of the invention to provide a resilient impact absorbing bumper that does not permanently deform during low impact collisions.

It a further object of the invention to provide an impact absorbing bumper that can be manufactured and maintained at reasonable cost and can survive collisions of low and intermediate intensity without permanent damage.

It is a further object of the invention to provide a simply constructed impact absorbing bumper that is made of modular components that can be readily removed and replaced if necessary after a major collision without significant down time.

Further objects of the invention will be apparent from review of the disclosure, drawings and description of the invention below.

DISCLOSURE OF THE INVENTION

The invention provides a resilient bumper assembly for a vehicle having an elongate horizontal beam mounted transversely to an end of the vehicle. Exterior flexible sheet cladding mounted on the beam defines an elongate internal chamber between its inner surface and the outer surface of the beam. An elongate resilient impact absorber is mounted to the beam and housed within the internal chamber, with top, bottom, inner and outer surfaces.

Vertically extending cavities within the impact absorber, each opening to at least one of the top and bottom surfaces of the impact absorber provide resilient collapsing and rebound of the impact absorber on impact. The absorber may include variations in the size and shape of cavities, and variations in the material of which it is moulded in order to modify the resilient characteristics of the absorber to suit different design needs. By simply adopting a different pattern, shape or size of cavity, the resilience of the absorber may be easily adjusted.

The invention provides an impact absorber, which can be adjusted or fine-tuned to suit various expected impact loadings. For example, the resilience of the impact absorber can be varied between the inner or outer surfaces or the lateral and central sections. Depending on the results of experimental testing for example, the strength of resilient plastic material of which the impact absorber is moulded can be modified or varied throughout the length, width or depth of the bumper.

In addition, the pattern, size, configuration or shape of cavities can be readily changed by merely providing different inserts in the mould that forms the impact absorber without changing the outer appearance of the bumper in any way. Therefore, a manufacturer can commit to the outer dimensions of the bumper and cladding as well as the mechanical connection of the beam to the vehicle frame while retaining flexibility in the impact absorbing properties of the bumper by modifying the size, shape, pattern and configuration of the various cavities which can be placed within the impact absorber to modify its resilient properties. Different flexibility and rebound characteristics car. be fine tuned as a result of experimental tests or as a result of observations from actual collisions in use of urban transit vehicles for example. The user need not to be committed to a particular resilience but may utilize the same outer cladding and support beam for different vehicles or different applications since the internal impact absorbing member need only be changed.

A further significant advantage of the invention is that components are manufactured in modules, which are mounted together during assembly with minimal use of mechanical fasteners. Preferably the cladding is moulded in three components which if damaged can be readily removed and replaced. The cladding is interlocked with the beam with a sliding dove tail connection and the entire bumper assembly is secured in place with minimal fasteners. In the embodiment illustrated, only four threaded studs are used to secure the entire bumper together. In contrast, many of the prior art bumpers require several mechanical fasteners and therefore include significant time and labour to manufacture and to repair after damaged in a collision. The present invention, in contrast, requires only four washers and nuts threaded onto the four threaded studs to secure all components together on the beam. In the event of damage from impact, any damaged modular components can be removed and recycled. Replacement modular components can be quickly installed on the beam thereby reducing down time for the vehicle after any collision.

In the prior art, use of a closed cell foam has the significant disadvantage that the force of impact will cause some of the closed cell air bubbles to rupture or burst when the air inside is compressed. Rupture of the walls between cells of a foam will then reduce the resistance to compression or reduce the resilient rebound of the foam mass. Repeated impacts to the foam will change the resilience of different bumpers and between different areas within the same bumper such that the overall performance of the resilient material is inconsistant and unpredictable. Use of open cell foam has the disadvantage that water is readily absorbed through leakage into the bumper, and through vapour condensation. Accumulation of water, especially in cold climates subject to freezing, also changes the resilience of the foam. Freeze-thaw cycling can cause the wet foam material Lo breakdown as the water expands and contracts repeatedly.

The present invention however provides a different means of managing the energy of impact, air flow and water accumulation. Repeated impacts do not result in changes to the resilience of the impact absorber, but rather the solid wall structure is configured such that complete recovery occurs. The cavities within the impact absorber are oriented on a vertical axis since the force of the impact of collision will be directed along a generally horizontal plane. The force of impact initially will collapse the flexible cladding. Air within the cavities can readily escape through the openings at the top and bottom of the impact absorber between the cladding and impact absorber. In contrast, closed and open cell foam absorbers of the prior art, contain air within the cells. The air in the closed cells compresses on impact since it cannot escape readily and ruptures the walls of the cells under high air pressure on impact.

In the present invention, impacts of a large magnitude will distort or collapse the vertically extending cavities within the resilient impact absorbing material. The larger the impact force, the greater the local distortion of the vertically extending cavites. The air within the cavities escapes and returns rapidly thereby allowing the impact absorber to recover it's original shape without loss of resilience. In the case of major impacts, the modular components of the bumper may be dislodged from the beam entirely. However, reliance on the rigid metal beam prevents further damage to the vehicle even if the resilient components have been damaged or dislodged.

Further advantages of the invention will be apparent from the following detailed description and accompanying drawings.

DESCRIPTION OF THE DRAWING

In order that the invention may be readily understood, one embodiment of the invention is illustrated by way of example in the accompanying drawings.

FIG. 5 is a top plan view of a first embodiment showing hexagonal prismatic cavities in the impact absorber.

FIG. 6 is a detail end view of the impact absorber of FIG. 5.

FIG. 7 is a vertical cross-sectional view along line 7—7 of FIG. 5.

Further details of the invention and its advantages will be apparent from the detailed description included below.

DETAILED DESCRIPTION OF PREFERRED EMBODIMENTS

Figure 1:
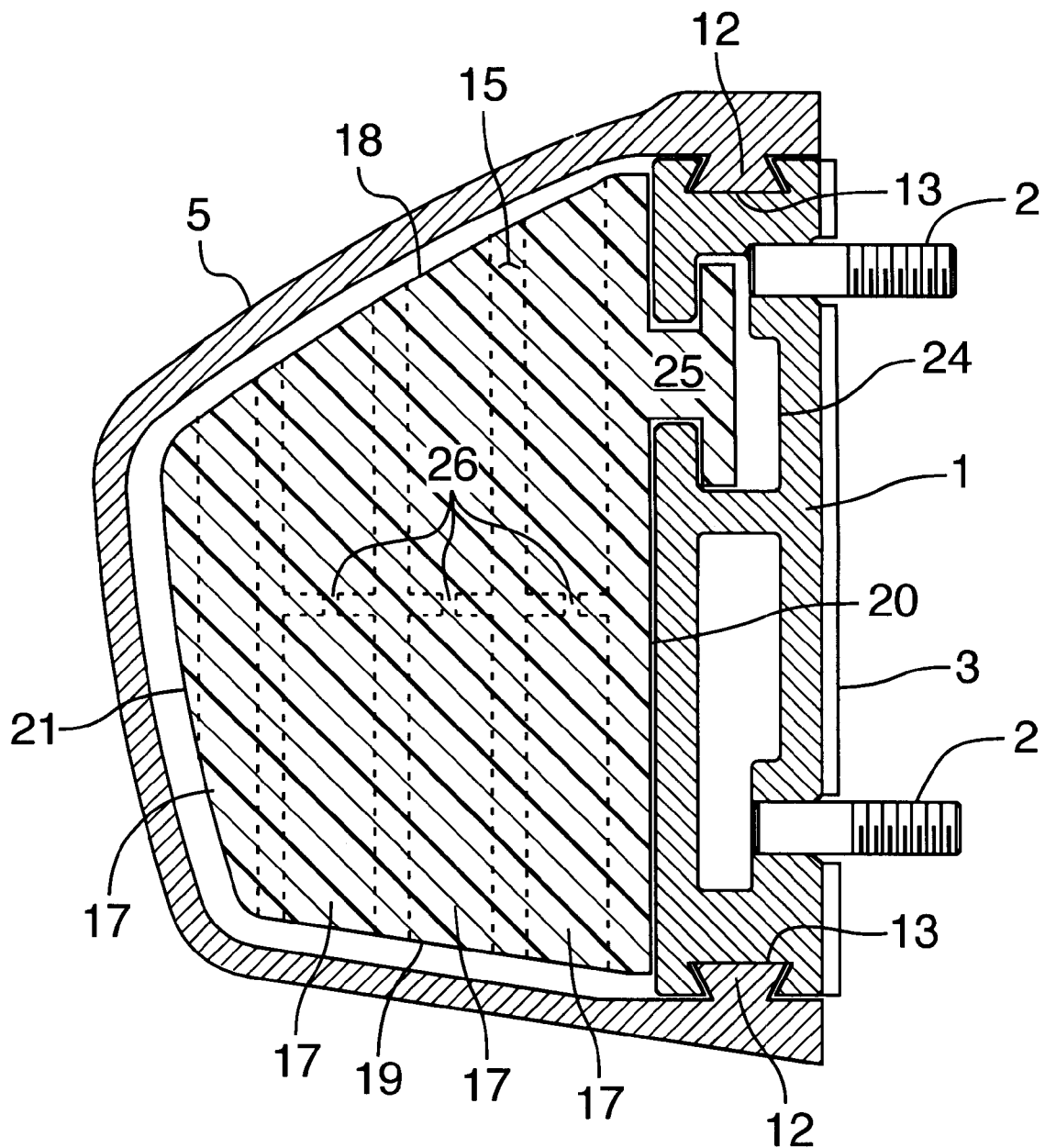
FIG. 1 is a cross-sectional view through the bumper assembly showing an extruded aluminium beam with top and bottom dovetail slots mounting the flexible sheet cladding, and a T-slot for mounting a T-shaped tongue of the impact absorber housed within the cladding
Figure 2:
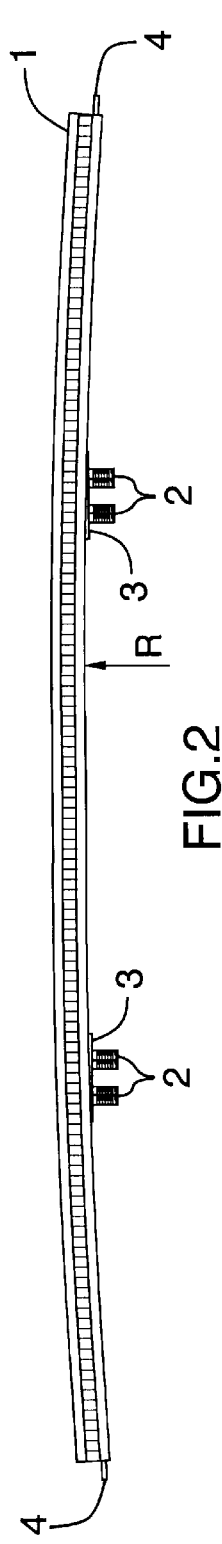
FIG. 2 is a top plan view of the beam showing threaded stud fasteners on the lateral ends for mounting the wings of the cladding, and intermediate mounting studs for mounting the beam to the frame of the vehicle.
Figure 3:
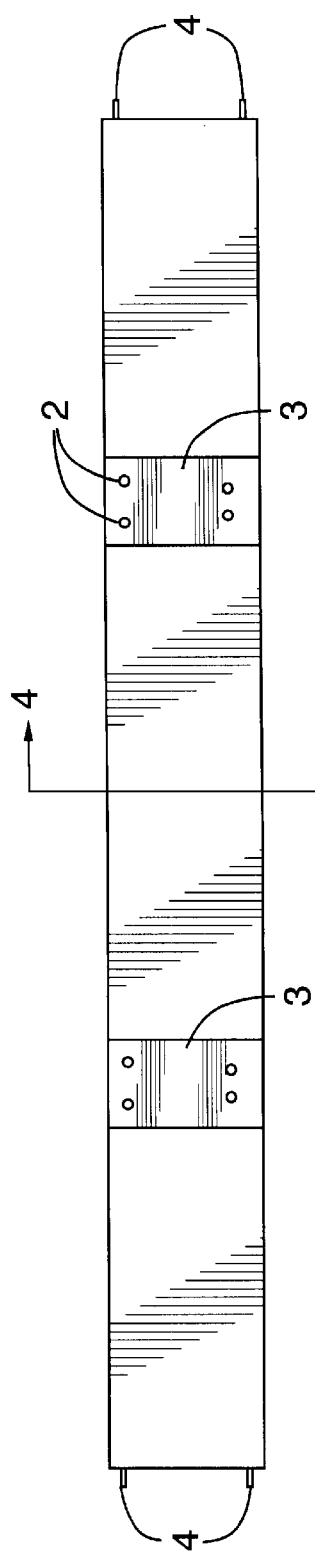
FIG. 3 is an elevation view of the inner surface of the beam showing mounting plates and studs.
Figure 4:
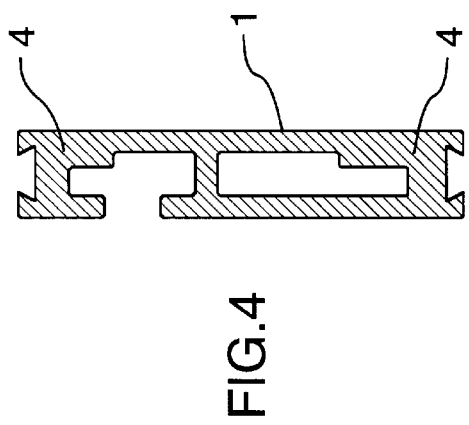
FIG. 4 is a vertical cross-sectional view along line 4—4 of FIG. 3.

FIG. 1 shows a vertical cross section through the resilient bumper assembly. An elongate horizontal beam 1 is mounted transversely to each end of the vehicle (not shown) using threaded studs 2 and reinforcing plates 3. FIGS. 2, 3 and 4 show details of the beam 1 which in the embodiment illustrated is an extruded aluminium section of uniform cross section throughout its length. The beam 1 may be straight or curved as in the example of FIG. 2 with radius R.

Use of a curved beam 1 with other mounted components curved as well has advantages that are not merely related to visual appeal. When another vehicle collides with the curved bumper, on initial contact a relatively small area of the resilient bumper material is compressed since the curved shape contacts with the other vehicle in a limited area of the curve only. As the vehicles move even closer together during a collision, the area of contact grows wider engaging more of the resilient bumper material. The progressive spreading of the impact loading over an increasing area of the bumper surface, results in a progressive increase in the resisting force exerted by the bumper. A more gradual deceleration of the colliding vehicles and a more uniform predictable distribution of stresses results.

In order to accommodate end mountings of the vehicle frame or shock absorbing cylinders, when the beam 1 is curved the plates 3 are tapered, as seen in FIG. 2, to compensate for the radius R. At each lateral end of the beam 1, threaded studs 4 are provided in order to mount the resilient modular resilient components of the bumper system that will be described below.

As seen in FIG. 1, exterior cladding 5 is mounted to the beam 1 with sliding dovetail joints at the top and bottom surfaces of the beam 1. The cladding 5 defines an elongate internal chamber between the internal surface of the cladding 5 and the forward surface of the beam 1.

Figure 8:
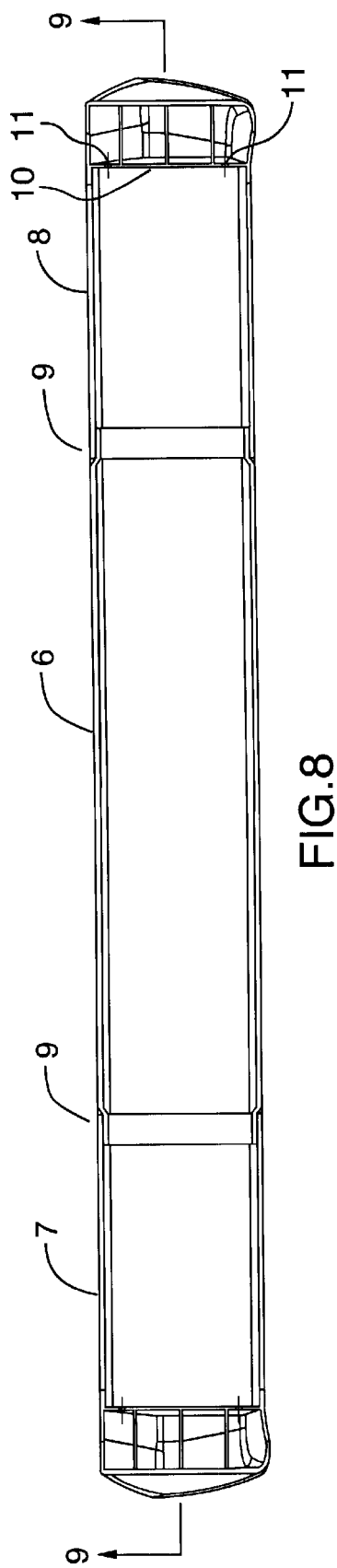
FIG. 8 is an inner elevation view of the cladding showing central section and two wing sections joined with a ship lap joint.
Figure 9:
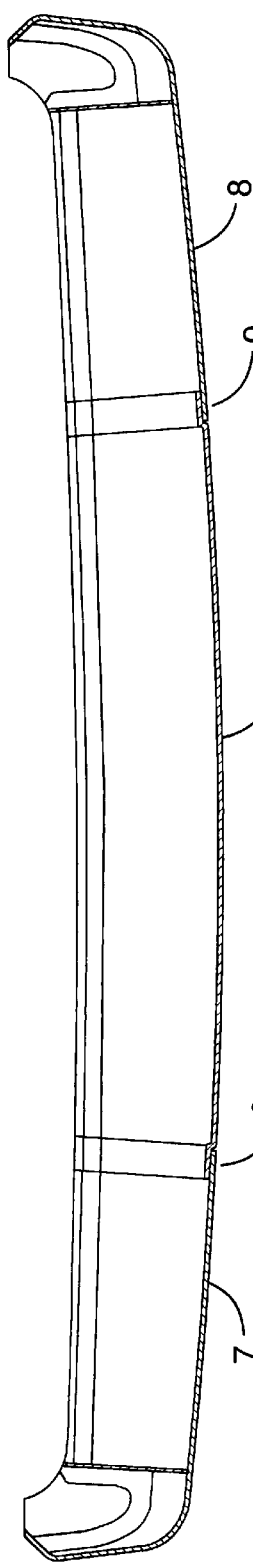
FIG. 9 is a horizontal section view along line 9—9 of FIG. 8.
Figure 10:
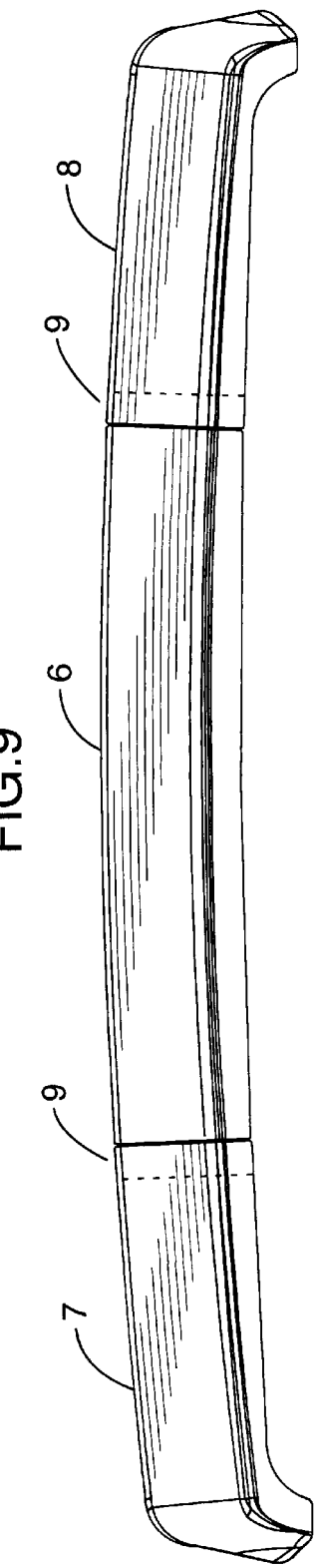
FIG. 10 is a top plan view of the cladding showing the appearance of the top surface and ship lap joint.

As seen in detailed views of FIGS. 8, 9 and 10 the cladding 5 is preferably made of multiple modular components including for example, a central section 6 and two wing sections 7 and 8 disposed on opposing lateral ends of the central section 6. The lateral ends of the central section 6 and adjacent ends of the associated wing sections 7 and 8 form an overlapping ship lap joint 9. In the event that a collision occurs on a wing section 7, 8 only for example, the remaining central section 6 and wing section 7, 8 may be retained and the damaged wing section 7, 8 replaced. Particularly, in the case of urban transit vehicles where cost savings are important and low to medium level collisions are frequent, speed of maintenance and low cost repairs are extremely important.

As seen in FIG. 8, the wing sections include a bulkhead or mounting tab 10 with two stud mounting holes 11 for mounting the wing sections 7 and 8 securely on threaded studs 4 extending from the lateral ends of the beam 1.

Therefore, after the beam 1 and impact absorber 15 have been assembled, the cladding 5 is installed as follows. The central section 6 is secured merely by sliding the dovetail tongue 12 in the matching dovetail slot 13. Once the central section 6 is positioned, the wings 7 and 8 are attached to the beam 1 in a similar matter by sliding tongue 12 in slot 13 until the lap joint 9 is formed and tab 10 abuts the lateral end of the beam 1 with threaded studs 4 protruding through holes 11. At this point, washers and nuts (not shown) can be fixed on the studs 4 and the entire cladding 5 is secured on the beam 1 enveloping the impact absorber 15.

Referring to FIGS. 1, 5, 6 and 7, the elongate resilient impact absorber 15 is mounted to the beam 1 and is housed within the internal chamber formed by the inner surface of the cladding 5 and the forward wall of the beam 1. With relatively larger impacts however the resilient impact absorber 15 receives the impact forces. Cavities 17 collapse and distort resiliently to absorb further impact.

The impact absorber 15 has a top surface 18, a bottom surface 19, inner surface 20 and outer surface 21. As best seen in FIG. 5 and 6, the vertically extending cavities 17 open to at least one the top and bottom surfaces 18 and 19 of the impact absorber 15. In the embodiment illustrated in FIGS. 5, 6 and 7, the cavities 17 define a plurality of interconnected vertical walls 22 and interconnecting nodes 23 joining the walls within the impact absorber 15. It will be understood that the honeycomb pattern shown in the first embodiment of FIGS. 5 and 6 is one example only and any conceivable pattern of cavities 17 can be accommodated easily by modifying the forming mould.

The beam 1 includes a T-slot 24 into which the T-shaped tongue 25 slides horizontally. The impact absorber 15 can be moulded in a single elongate component, as shown in FIG. 5, or advantageously can be cut into of smaller segments (not shown) for ease of manufacture, assembly and repair. Two or more segments can be disposed in end to end alignment by sliding components in the T-slot 24.

Figure 11:
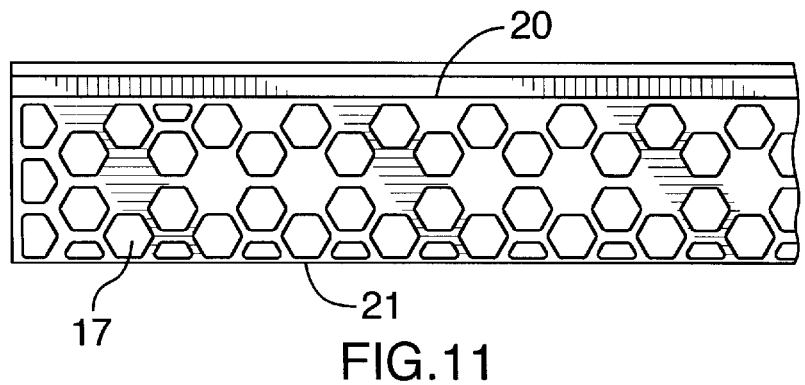
FIGS. 11, 12, 13 and 14 are top plan views similar to FIG. 5 of second, third, fourth and fifth embodiments showing different patterns, sizes and shapes of cavities to vary the resilient characteristics of the impact absorber.

In order to vary the resilience of the impact absorber 15, different patterns may be adopted as shown for example in FIGS. 11, 12, 13 and 14. The resilience of the impact absorber 15 may vary between the outer surface 21 and the inner surface 20 by blanking out cavities 17, as shown in FIG. 11. By providing more cavities 17 of the same size and shape toward the outer surface 21 relative to the inner surface 20, the resilience of the impact absorber 15 is more pronounced on the outer surface area 21 and can absorb impacts of lesser intensity. The variation between cavities shown in FIG. 5 and in FIG. 11 results from blanking out some cavities 17 in the mould where cavities 17 have a substantially uniform horizontal cross sectional profile through their vertical extent as shown in FIG. 1. To vary the resilient properties however the cavities 17 may be formed with a pronounced taper with varying resilient capacity alone the vertical extent of the cavity 17.

Figure 12:
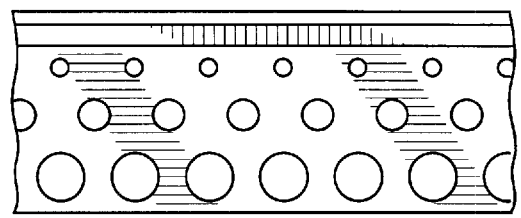
Figure 13:
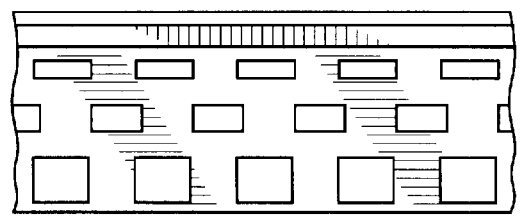
Figure 14:
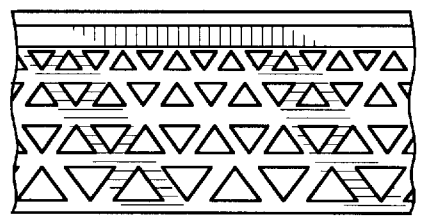

Further variation in the cavity shape is seen in FIGS. 12, 13 and 14 where circular, triangular, rectangular, pentagonal or hexagonal shapes as well as any other common shape may be adopted depending on the specific experimental results from impact testing. The horizontal cross sectional profile dimension of cavities shown in FIGS. 12, 13, and 14 varies between cavities 17 adjacent to the outer surface 21 and inner surface 20 of the impact absorber 15. By providing larger shaped cavities 17 on the outer surface area 21, increased resilience is provided for minor impacts whereas increased resilience is provided for impacts of a higher magnitude.

Further variation in the design of the cavities 17 is shown in a comparison between FIG. 7 and FIG. 1. In FIG. 1, the cavity 17 passes straight through vertically between the top 18 and bottom 19 surfaces of the impact absorber 15. In FIG. 1 however, a horizontal planar web 26 is formed by providing cavities 17 of a depth less than the absorber height. In the particular embodiment shown in FIG. 1, the cavities 17 are disposed in vertically opposing relation between the top and bottom surfaces 18, 19 and have a depth less than one half of the absorber height. As a result, the webs 26 are formed providing further horizontal resistance to collapse of the cavities 17 on receiving a horizontally directed force of impact.

In conclusion, the invention provides a very simple bumper assembly that is readily constructed using sliding connections 12, 13, 24 and 25. The entire assembly is secured together made from modular units attached with four studs 4 and sliding joints only. Further flexibility is provided to adjust the resilient capability of the absorber 15 by easily accomdating different sizes, shapes, patterns, depth and orientations for the cavities 17. The material of the absorber 15 can be modified as well choosing different elastomeric or plastic materials for the required resilient force.

The invention provides a bumper assembly, that can be quickly assembled from modular components with minimum labour and can be repaired after collision by replacing damaged components only. The same bumper assembly can be utilized for various applications requiring different impact absorbing properties simply by changing the design of the internal impact absorbing 15 using various shapes, sizes, configurations and patterns of cavities 17 and/or different elastomeric or plastic materials.

Although the above description relates to a specific preferred embodiment as presently contemplated by the inventor, it will be understood that the invention in its broad aspect includes mechanical and functional equivalents of the elements described herein.

I claim:

1. A resilient bumper assembly for a vehicle comprising:
   an elongate horizontal beam mounted transversely to an end of the vehicle;
   exterior cladding mounted on the beam defining an elongate internal chamber therebetween, the cladding comprising a flexible sheet:
   an elongate resilient impact absorber mounted to the beam and housed within the internal chamber, the impact absorber having top, bottom, inner and outer surfaces; and
   a plurality of vertically extending cavities within the impact absorber, each cavity opening to at least one of the top and bottom surfaces of the impact absorber.

2. A resilient bumper assembly according to claim 1 wherein the resilience of the impact absorber varies between the outer and the inner surfaces.

3. A resilient bumper assembly according to claim 1 wherein the cavities define a plurality of interconnected walls and nodes within the impact absorber.

4. A resilient bumper assembly according to claim 3 wherein the walls between cavities have varying thickness within the impact absorber.

5. A resilient bumper assembly according to claim 1 wherein the cavities have a substantially uniform horizontal cross-sectional profile throughout their vertical extent.

6. A resilient bumper assembly according to claim 1 wherein the cavities have a horizontal cross-sectional profile that reduces in relative size between cavities adjacent to the outer surface and inner surface of the impact absorber.

7. A resilient bumper assembly according to claim 1 wherein the impact absorber has a height dimension between the top and bottom surfaces, and wherein the cavities have a depth less than the absorber height dimension.

8. A resilient bumper assembly according to claim 7 wherein the cavities are disposed in vertically opposing relation between the top and bottom surfaces and have depth less than one half of the absorber height.

9. A resilient bumper assembly according to claim 1 wherein the cavities are of horizontal cross-sectional profile selected from the group consisting of: circular; triangular; rectangular; pentagonal; and hexagonal.

10. A resilient bumper assembly according to claim 1 wherein the impact absorber comprises a plurality of segments disposed in end-to-end alignment.

11. A resilient bumper assembly according to claim 1 wherein the absorber is mounted to the beam with a horizontally slidable connection.

12. A resilient bumper assembly according to claim 11 wherein the absorber to beam connection comprises a T-slot and T shaped tongue.

13. A resilient bumper assembly according to claim 1 wherein the cladding is mounted to the beam with a horizontally slidable connection.

14. A resilient bumper assembly according to claim 13 wherein the cladding to beam connection comprises a dovetail slot and dovetail shaped tongue.

15. A resilient bumper assembly according to claim 1 wherein the cladding comprises a central section and two wing sections disposed on opposing lateral ends of the central section.

16. A resilient bumper assembly according to claim 15 wherein the lateral ends of the central section and adjacent ends of an associated wing section are disposed in overlapping relation.

17. A resilient bumper assembly according to claim 15 wherein each wing is releasably mounted to a lateral end of the beam.

18. A resilient bumper assembly according to claim 17 wherein the wings include mounting tabs extending into the internal chamber, and wherein the wings are mounted to the beam on a fastener extending from each lateral end of the beam.

* * * * *